United States Patent
Fiorentino

(10) Patent No.: US 12,543,030 B2
(45) Date of Patent: Feb. 3, 2026

(54) RADIO UNIT FOR PROVIDING NETWORK CONNECTIVITY TO ONE OR MORE USER EQUIPMENT ONBOARD A VEHICLE

(71) Applicant: Vincenzo Fiorentino, Nuremberg (DE)

(72) Inventor: Vincenzo Fiorentino, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 483 days.

(21) Appl. No.: 18/134,551

(22) Filed: Apr. 13, 2023

(65) Prior Publication Data

US 2023/0336967 A1    Oct. 19, 2023

(30) Foreign Application Priority Data

Apr. 14, 2022 (EP) .................................. 22168514

(51) Int. Cl.
*H04W 4/40* (2018.01)
*H04W 8/08* (2009.01)
*H04W 48/18* (2009.01)

(52) U.S. Cl.
CPC ............. *H04W 8/08* (2013.01); *H04W 48/18* (2013.01); *H04W 4/40* (2018.02)

(58) Field of Classification Search
CPC ......... H04W 48/18; H04W 4/44; H04W 4/46; H04W 4/48; H04W 4/40; H04W 76/15; H04W 88/10; H04W 88/06; H04W 8/065; H04W 8/08; H04W 60/002

See application file for complete search history.

(56) References Cited

U.S. PATENT DOCUMENTS

| | | | | |
|---|---|---|---|---|
| 12,302,233 | B2* | 5/2025 | Zhu | H04W 36/322 |
| 2016/0219251 | A1* | 7/2016 | Väre | H04N 21/21805 |
| 2016/0366049 | A1* | 12/2016 | Achouri | H04L 45/24 |
| 2019/0053148 | A1* | 2/2019 | Lee | H04W 48/18 |
| 2023/0422142 | A1* | 12/2023 | Vakeesar | H04W 40/20 |

* cited by examiner

*Primary Examiner* — Marcus Hammonds
(74) *Attorney, Agent, or Firm* — Lempia Summerfield Katz LLC

(57) ABSTRACT

A radio unit for providing network connectivity to one or more user equipment onboard a vehicle is provided. The radio unit includes a first network interface connectable to the one or more user equipment onboard the vehicle, and a second network interface connectable to a first network slice via a wayside network. The first network slice is connected to a home network associated with at least one user equipment. The first network slice is configured to transport one or more traffic streams, associated with the at least one user equipment. The second network interface is connectable to the first network slice over a user plane function of a second network slice. The first network slice includes a first network function for mapping one or more protocols of the first network slice and the one or more protocols of the second network slice.

12 Claims, 2 Drawing Sheets

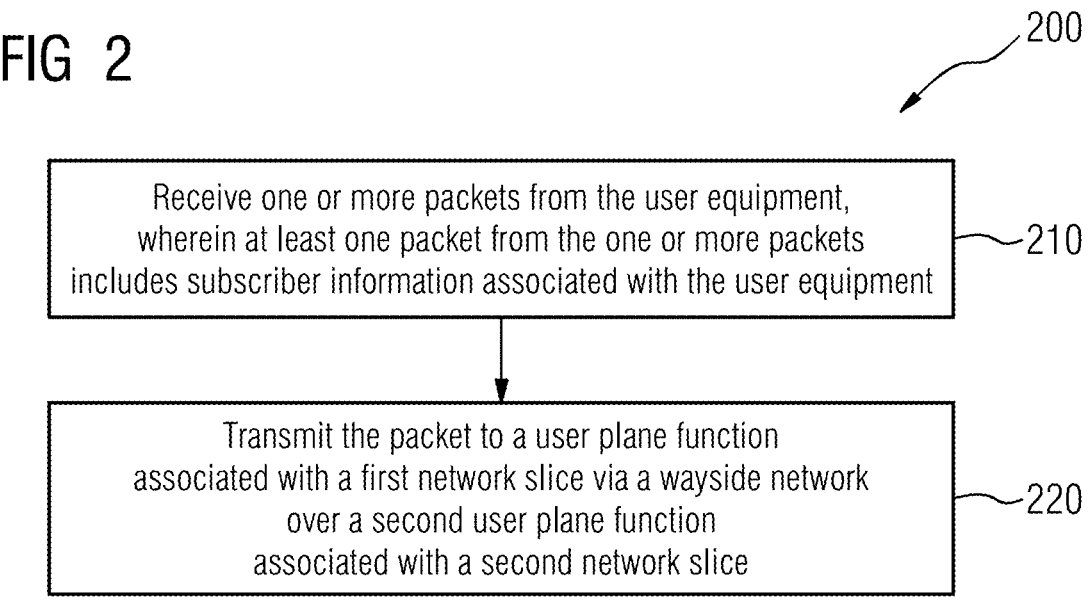
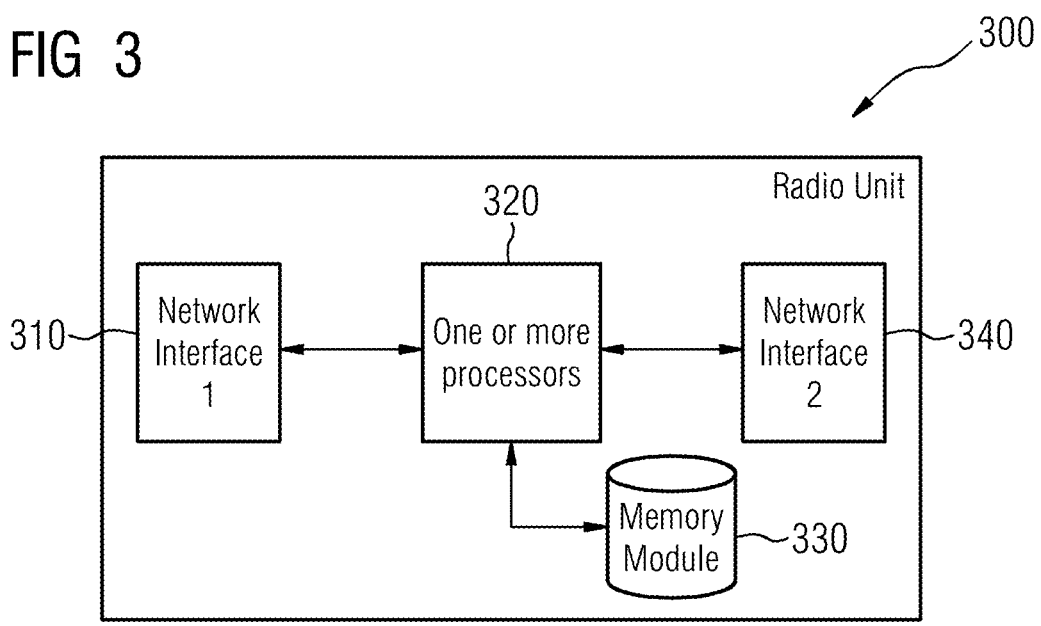

RADIO UNIT FOR PROVIDING NETWORK CONNECTIVITY TO ONE OR MORE USER EQUIPMENT ONBOARD A VEHICLE

This application claims the benefit of European Patent Application No. EP 22168514.2, filed on Apr. 14, 2022, which is hereby incorporated by reference in its entirety.

BACKGROUND

The current disclosure relates to wireless communication techniques in industrial environments and, more specifically, in relation to communication associated with vehicles used within industrial environments. Due to the nature of industrial applications, associated communications are to provide high availability and reliability.

SUMMARY AND DESCRIPTION

The current embodiments relate to wireless communication in the context of industrial automation. As mentioned above, due to the critical nature of industrial applications, high availability and reliability are to be provided. This is the case in relation to vehicles and other such mobile equipment used in the context of industrial automation. However, this is challenging in the context of trains and other such long distance transportation.

For example, onboard coverage for industrial and passenger equipment aboard in trains is difficult as coverage of mobile operator networks is not always optimized for the train tracks. Conventionally, train network infrastructure includes cellular routers that connect to the mobile operator network, which are connected local WLAN equipment that provide indoor coverage to the industrial and passenger equipment by WLAN. Although the cellular routers may have multiple SIMs to connect to a number of operators and choose the best among them, this solution will not necessarily deliver a good and reliable service since the coverage of the mobile operator network is often poor, since they often share the same antenna site. This results in no real difference amongst the different mobile operators. Most rail tracks are in rural areas where the coverage is achieved with 2G networks that do not have sufficient data rate. Further, the propagation conditions may be hostile due to the landscape, mountains, train speed, and indoor propagation inside the train. Because of this, industrial and passenger equipment often suffers from loss of coverage and poor service quality. To address these issues, the current disclosure describes a network infrastructure that provides a dedicated 5G network for transmission of packets from the industrial and passenger equipment onboard the train.

Accordingly, the current disclosure describes a radio unit for providing network connectivity to one or more user equipment onboard a vehicle. The radio unit is located on the vehicle. The radio unit includes a first network interface connectable to the one or more user equipment onboard the vehicle, and a second network interface connectable to a first network slice via a wayside network. The first network slice is connected to a home network associated with at least one user equipment from the one or more user equipment. The first network slice is configured to transport one or more traffic streams including one or more packets, associated with the at least one user equipment. The second network interface is connectable to the first network slice over a user plane function of a second network slice. The first network slice includes a first network function for mapping one or more protocols of the first network slice and the one or more protocols of the second network slice.

Accordingly, the current disclosure describes a radio unit that is configured to provide connectivity to the industrial and passenger equipment onboard the train using dedicated 5G network slices and a wayside network. By using dedicated network slices, the current disclosure provides that the equipment onboard the vehicle does not suffer from poor coverage, as the wayside network and the dedicated network slices offer optimal coverage throughout the route of the vehicle. Further, by using two dedicated network slices, a first slice for communication with the home network and a second slice for intra network communication, the current disclosure provides communication reliability and low latency for the user equipment onboard the train.

In an example, the first network slice includes a roaming function for exchanging user information associated with the at least one user equipment with the home network. Accordingly, using the above mentioned roaming function, the current disclosure is able to offer inbound roaming services to customers of mobile network operators. Both roaming approaches are supported: local break out (LBO) and home routed (HR). In an example, the at least one user equipment is registered with a subscriber server of the home network.

In an example, the second network slice includes a second network function for providing one or more services to the at least one user equipment. The one or more services are associated with the vehicle. Accordingly, the current disclosure may provide specific vehicular services to the devices onboard. For example, the specific services may include ticketing services, localization services, etc. In an example, the radio unit is connected to the first network slice via a distributed unit located onboard the vehicle. In addition to the distributed unit, additional network equipment may also be present on the vehicle. For example, a distributed base station (gNB) may also be located on vehicle. Accordingly, additional network infrastructure accordingly may be located or installed on the vehicle to reduce network communication related delays.

In an example, the vehicle is a train, an automated guidance vehicle, or a mining cart. Accordingly, the disclosure may be used in a plurality of industrial environments to facilitate communication.

In another aspect, the current disclosure describes a method of transmitting packets from a user equipment onboard a vehicle to a home network associated with the user equipment. The method includes receiving one or more packets from the user equipment. At least one packet from the one or more packets includes subscriber information associated with the user equipment. The method includes transmitting the packet to a user plane function associated with a first network slice via a wayside network over a second user plane function associated with a second network slice. The first network slice is connected to the home network associated with the user equipment. The first network slice includes a first network function for mapping one or more protocols of the first network slice and the one or more protocols of the second network slice.

In an example, the method further includes encapsulating the one or more packets in a first format associated with the second user plane function associated with the second network slice. In an example, the first network function is configured to decapsulate the one or more packets from the first format associated with the second user plane function associated with the second network slice.

In another aspect, the current disclosure describes a non-transitory storage medium for transmitting packets from a user equipment onboard a vehicle to a home network associated with the user equipment. The non-transitory storage medium includes a plurality of instructions that, when executed on one or more processors, cause the one or more processors to receive one or more packets from the user equipment. At least one packet from the one or more packets includes subscriber information associated with the user equipment. The plurality of instruction, when executed on the one or more processors, also cause the one or more processors to transmit the one or more packets to a user plane function associated with a first network slice via a wayside network over a second user plane function associated with a second network slice. The first network slice is connected to the home network associated with the user equipment. The first network slice includes a first network function for mapping one or more protocols of the first network slice and the one or more protocols of the second network slice. The advantages of the device apply to the method and the non-transitory storage medium.

These aspects are further explained with reference to FIGS. 1-3.

BRIEF DESCRIPTION OF THE DRAWINGS

FIG. 2 illustrates a method for transmitting packets from a user equipment onboard a vehicle to a home network associated with the user equipment; and FIG. 3 illustrates a radio unit for transmitting packets from a user equipment onboard a vehicle to a home network associated with the user equipment.

DETAILED DESCRIPTION

Figure 1:
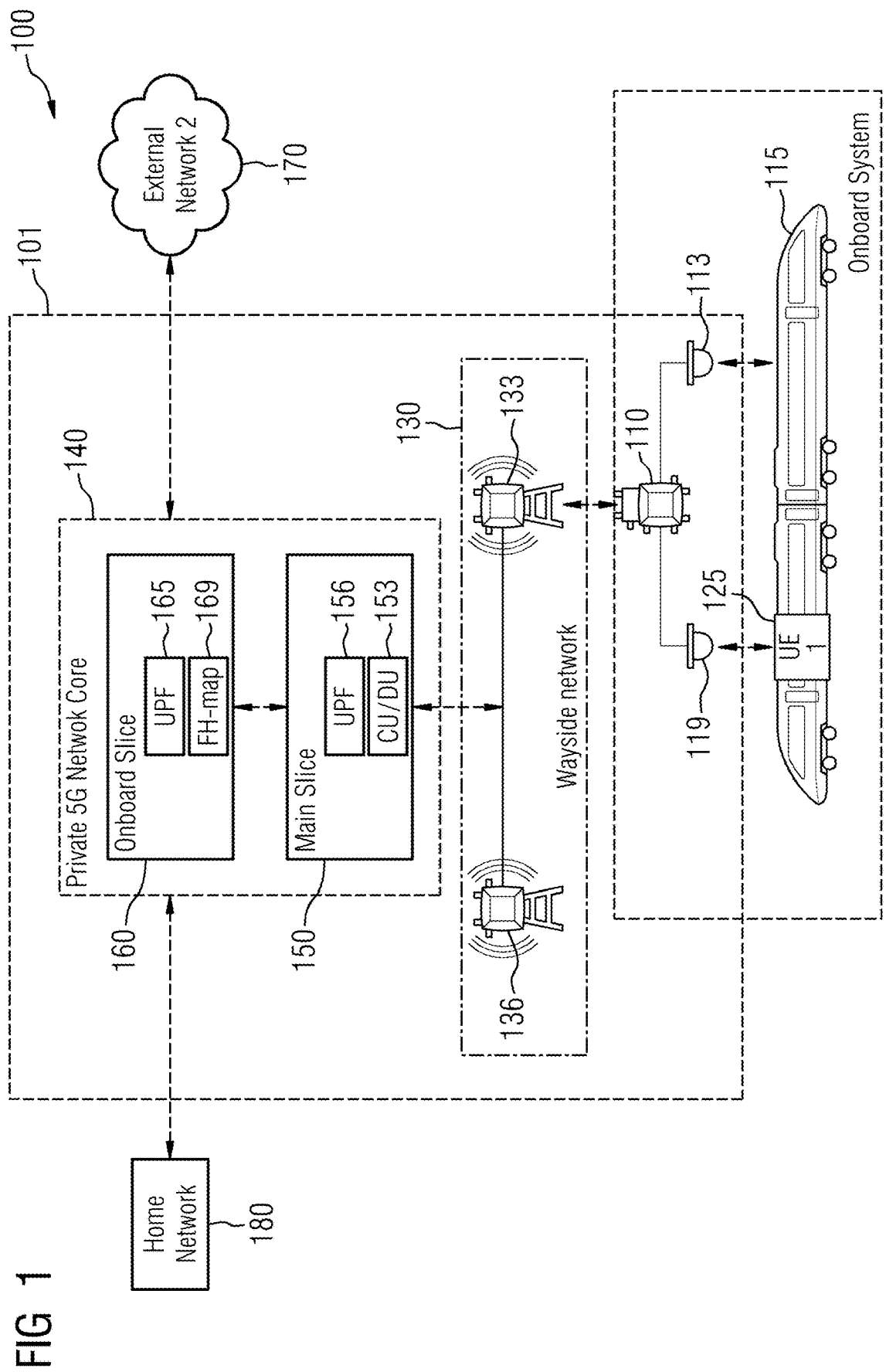
FIG. 1 illustrates a dedicated wireless network deployed for communication onboard a vehicle.

FIG. 1 illustrates a dedicated wireless network 101 for communication onboard a vehicle 115 in an industrial environment. Industrial environment herein refers to any environment where one or more industrial processes such as manufacturing, refining, smelting, assembly of equipment may take place and includes process plants, oil refineries, automobile factories, electrical power plants, transportation infrastructure such as railways, ships, etc. The vehicle 115 may include a plurality of control devices connected to a plurality of field devices for monitoring and regulating one or more processes on the vehicle 115. Vehicle herein refers to any machine capable of transporting material or personnel from one location to another. Examples of vehicles include automated guidance vehicles, mining carts, trains, automobiles, etc.

The dedicated wireless network 101 includes one or more network devices installed onboard the vehicle 115 (e.g., radio unit 110 and one or more access points 119 and 113, as shown in FIG. 1). The one or more network devices onboard the vehicle 115 are connected to a network core 140 via a wayside network 130. In an example, the one or more network devices onboard the vehicle 115 include a distributed unit (not shown in FIG. 1). The radio unit 110 is connected to the distributed unit, which is connected to the network core 140. Other radio units may also be present onboard the vehicle 115 along with the radio unit 110.

The wayside network 130 includes a plurality of network infrastructure devices 133 and 136, and includes, for example, radio units, distributed units, central units, etc. As mentioned previously, the wayside network 130 is connected to the network core 140. The central units process non-real time protocols and services. The distributed units process physical level protocols and latency-critical real time services. The radio units carry out link layer and physical layer signal processing when transmitting and receiving radio signals. A plurality of well-known protocols (such as eCPRI) may be used for communication amongst these components.

The dedicated wireless network 110 includes a network core 140 for managing and operating the dedicated wireless network 101. The network core 140 includes two network slices: a first network slice 160 (also referred to as onboard slice 160) and a second network slice 150 (also referred to as the main slice 150). The first network slice 160 handles communication between the user equipment and external networks such as the home network associated with at least one user equipment. The first network slice 160 includes a plurality of network functions for handling and managing the communication associated with the user equipment. The plurality of the network functions of the first network slice 160 include a user plane function 165 that serves as the network plane over which connection between the external networks and the user equipment is established and packets are transported between the user equipment and the external networks.

The second network slice 150 manages and handles the wayside network 130 and the communication occurring over the wayside network 130. The second network slice 150 includes a plurality of network functions. The wayside network 130 and the second network slice 150 are responsible for transporting packets associated with the first network slice 160. The wayside network 130 and the second network slice 150 act as a dedicated tunnel between the user equipment on the vehicle 115 and the first network slice 160 that allows for transportation of packets associated with the first network slice 160 over the user plane of the second network slice 150. These aspects are further explained with reference to FIG. 2.

FIG. 2 illustrates a method 200 of transmitting packets from a user equipment onboard a vehicle to a home network associated with the user equipment. In an example, the method 200 is performed by the radio unit 110 onboard the vehicle 115. The radio unit 110 includes a first network interface connectable to the one or more user equipment 125 onboard the vehicle 115 and a second network interface connectable to the first network slice 160 via the wayside network 130.

At act 210, the radio unit 110 receives one or more packets from the user equipment 125 via the first network interface. The one or more packets include at least one packet including subscriber information associated with the user equipment 125. In an example, the radio unit 110 receives the packets from the user equipment 125 via an access point onboard the vehicle 115. The user equipment 125 connects to the access point over a local subnetwork including a plurality of access points and is limited to the vehicle 115. Subscriber information includes roaming information, network services enabled, billing information, etc.

Then, at act 220, the radio unit 110 transmits the one or more packets to the user plane function 165 associated with the first network slice 160 via the wayside network 130 over the second user plane function 156 associated with a second network slice 150. In order to transport the one or more packets over the second user plane function 156, the radio unit 110 and the first user plane function 165 include fronthaul map functions for mapping or translating/wrapping the one or more packets in the fronthaul protocols associated with the second network slice 150. For example, the first user plane function 165 includes a fronthaul map function 169 that is responsible for mapping, wrapping, and unwrapping protocols into/out of the fronthaul protocols associated with the second network slice 150. A similar fronthaul map function is implemented in the radio unit 110 onboard the vehicle 115. The fronthaul map function on the radio unit is for wrapping the packets from the user equipment and for unwrapping the packets received from the external networks via the first network slice 160.

For example, different fronthaul protocols may be used between the radio units and the distributed units of the first network slice 160 and the second network slice 150, depending on the split option used. Since the packets are transported to the first network slice 160 via the second network slice 150, the fronthaul (FH) protocols of the first network slice 160 are wrapped in the protocols of the second network slice 150. The fronthaul protocol mapping from one slice to the other is performed by two or more fronthaul map functions. The fronthaul map functions manage the translation of the flow of information between the two slices. In an example, the fronthaul map functions are responsible for requesting the correct QoS from the main slice for transportation of packets between the first user plane function 165 and the onboard radio unit and map the fronthaul protocols of the first network slice 160 onto the fronthaul protocols of the second network slice 150 including those associated with the user and control plane of the second network slice 150. For example, if the eCPRI protocol based packets are to be transported, then the fronthaul map function reads the appropriate field in the protocols of the packets associated with QoS and maps the information onto a 5G QoS flow associated with the second network slice 150, which may provide that level of QoS.

As an example, a split 7.2 is implemented on the first network slice 160, and eCPRI protocol is implemented between the radio unit and the distributed unit of the first network slice 160. Accordingly, eCPRI protocol of the first network slice 160 may be transported by the second network slice 150 either over IP or over Ethernet. Accordingly, the fronthaul map functions in the first network slice 160 (e.g., the onboard radio unit and the first user plane function 165) act as interworking function performing the mapping depending according to the protocol used between the first network slice 160 and the second network slice 150. As mentioned previously, in case of Ethernet based connection, the Fronthaul map functions hold a mapping of the MAC address of the RU with IP address of the UE to which it is connected and encapsulate the Ethernet frame into an IP packet to be routed to the RU behind the UE. Then, the IP packet is routed to the user plane function 156 of the second network slice 150. At the UE, the IP packet is routed to the destination RU that has a FH-Map function. This will extract the Ethernet frame and delivers to the Physical Layer elements. In case an IP transport mechanism is used between the DU and the RU, the FH-MAP at the DU forwards the IP packet to the UPF that has the capabilities to route the packet to right onboard UE. At the UE, the packet will be further routed to the destination RU.

Accordingly, the packets are transmitted to the first network slice 160 via the radio unit 115. As mentioned previously, the first network slice 160 is connected to the home network 180 associated with the user equipment 125. Accordingly, the first network slice 160 is configured to transmit the packets to the corresponding home network 180. Accordingly, network connectivity is provided between the user equipment and the home network 180 using the first network slice 160 and second network slice 150.

In an embodiment, the first network slice 160 also includes a roaming function for exchanging user information associated with the at least one user equipment 125 with the home network 180. Accordingly, using the roaming function, the first network slice 160 is configured to act as a visiting network for the user equipment and accordingly, fetch necessary information associated with the user equipment from the home network 180 based on the subscriber information. Accordingly, using the above mentioned roaming function, the current disclosure is able to offer inbound roaming services to customers of mobile network operators. Both roaming approaches are supported: local break out (LBO) and home routed (HR). In an example, the at least one user equipment 125 is registered with a subscriber server of the home network 180.

In an embodiment, the second network slice 150 includes a second network function for providing one or more services to the at least one user equipment 125. The one or more services are associated with the vehicle 115. Accordingly, the current disclosure may provide specific vehicular services to the devices onboard. For example, the specific services may include ticketing services, localization services, etc. The onboard core network also includes a local platform for specific onboard services. Once the users are on boarded and registered on the train network, the users may use such services via an application on their smartphones. As an example, the onboard network includes a location manager, and the user may ask via the application a help function to localize their seat and the nearest free baggage space. The user is localized by the onboard 5G network, and their position is shown on a train seating plan along with the position of the baggage space. The baggage space has sensors indicating the occupancy of such spaces; the application will then indicate the location of the nearest baggage space with live space availability.

Through a similar APP, the user may get information about the journey, the position of the train, the weather on the destination, and additional services, such as booking a taxi on arrival or purchasing a local bus or underground ticket.

In an embodiment, the second network slice is configured to provide one or more train control related services. For example, the second network slice delivers services (e.g., control, signaling, diagnostic, services to one or more train control equipment) in addition to transporting the packets associated with the first network slice. Additionally, the fronthaul map functions may be realized on the second network slice 150 instead of the first network slice 160 and the radio unit aboard.

In an example, the radio unit is connected to the first network slice 160 via a distributed unit located onboard the vehicle 115. Accordingly, additional network infrastructure may be located or installed on the vehicle 115 to reduce network communication related delays.

The present disclosure may take a form of a computer program product including program modules accessible from computer-usable or computer-readable medium (e.g., non-transitory computer-readable medium) storing program code for use by or in connection with one or more computers, processing units, or instruction execution system. For example, the radio unit or the user plane functions may be realized across one or more devices. For example, the current disclosure describes a radio unit device 300. The device 300 implements the method 200. The device 300 includes one or more network interfaces (310, 340), one or more processors 320, and a non-transitory storage medium 330. The non-transitory storage medium 330 contains a plurality of instructions for implementing the method 200. The plurality of instructions, when executed on one or more processors 320, cause the one or more processors 320 to receive one or more packets from the user equipment 125. At least one packet from the one or more packets includes subscriber information associated with the user equipment 125. The plurality of instructions, when executed on the one or more processors 320, also cause the one or more processors 320 to transmit the one or more packets to a user plane function 165 associated with a first network slice 160 via a wayside network 130 over a second user plane function 156 associated with a second network slice 150. The first network slice 160 is connected to the home network 180 associated with the user equipment 125. The first network slice 160 includes a first network function 169 for mapping one or more protocols of the first network slice 160 and the one or more protocols of the second network slice 150.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (or apparatus or device); propagation mediums in and of themselves as signal carriers are not included in the definition of physical computer-readable medium, which may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A radio unit for providing network connectivity to one or more user equipment onboard a vehicle, wherein the radio unit is located on the vehicle, the radio unit comprising:
   a first network interface connectable to the one or more user equipment onboard the vehicle; and
   a second network interface connectable to a first network slice via a wayside network, wherein the first network slice is connected to a home network associated with at least one user equipment from the one or more user equipment, and wherein the first network slice is configured to transport one or more traffic streams comprising one or more packets, associated with the at least one user equipment,
   wherein the second network interface is connectable to the first network slice over a user plane function of a second network slice, and
   wherein the first network slice includes a first network function for mapping one or more protocols of the first network slice and the one or more protocols of the second network slice.

2. The radio unit of claim 1, wherein the first network slice includes a roaming function for exchanging user information associated with the at least one user equipment with the home network.

3. The radio unit of claim 1, wherein the second network slice includes a second network function for providing one or more services to the at least one user equipment, and
   wherein the one or more services are associated with the vehicle.

4. The radio unit of claim 1, wherein the radio unit is connected to the first network slice via a distributed unit located onboard the vehicle.

5. The radio unit of claim 1, wherein the at least one user equipment is registered with a subscriber server of the home network.

6. The radio unit of claim 1, wherein the vehicle is a train, an automated guidance vehicle, or a mining cart.

7. A method of transmitting packets from a user equipment onboard a vehicle to a home network associated with the user equipment, the method comprising:
   receiving one or more packets from the user equipment, wherein at least one packet from the one or more packets includes subscriber information associated with the user equipment; and
   transmitting the one or more packets to a user plane function associated with a first network slice via a wayside network over a second user plane function associated with a second network slice,
   wherein the first network slice is connected to the home network associated with the user equipment, and
   wherein the first network slice includes a first network function for mapping one or more protocols of the first network slice and the one or more protocols of the second network slice.

8. The method of claim 7, further comprising encapsulating the one or more packets in a first format associated with the second user plane function associated with the second network slice.

9. The method of claim 8, wherein the first network function is configured to decapsulate the one or more packets from the first format associated with the second user plane function associated with the second network slice.

10. A non-transitory computer-readable storage medium that stores instructions executable by one or more processors for transmitting packets from a user equipment onboard a vehicle to a home network associated with the user equipment, the instructions comprising:
- receiving one or more packets from the user equipment, wherein at least one packet from the one or more packets includes subscriber information associated with the user equipment; and
- transmitting the one or more packets to a user plane function associated with a first network slice via a wayside network over a second user plane function associated with a second network slice,
- wherein the first network slice is connected to the home network associated with the user equipment, and
- wherein the first network slice includes a first network function for mapping one or more protocols of the first network slice and the one or more protocols of the second network slice.

11. The non-transitory computer-readable storage medium of claim 10, wherein the instructions further comprise encapsulating the one or more packets in a first format associated with the second user plane function associated with the second network slice.

12. The non-transitory computer-readable storage medium of claim 11, wherein the first network function is configured to decapsulate the one or more packets from the first format associated with the second user plane function associated with the second network slice.

* * * * *